United States Patent [19]

Pasternak

[11] Patent Number: 6,115,272
[45] Date of Patent: Sep. 5, 2000

[54] DUTY CYCLE BASED CHARGE PUMP CONTROLLER

[75] Inventor: John H. Pasternak, Campbell, Calif.

[73] Assignee: Waferscale Integration, Inc., Fremont, Calif.

[21] Appl. No.: 09/178,050

[22] Filed: Oct. 26, 1998

[51] Int. Cl.[7] .................................................. H02M 3/18
[52] U.S. Cl. .................................................. 363/60
[58] Field of Search .................................. 363/59, 60, 62

[56] References Cited

U.S. PATENT DOCUMENTS 5,589,762  12/1996  Iannuzo ................................. 323/351
5,672,952  9/1997  Szepesi .................................. 320/164
5,677,617  10/1997  Tokai et al. ........................... 323/222
5,680,300  10/1997  Szepesi et al. .......................... 363/59

*Primary Examiner*—Adolf Deneke Berhane
*Attorney, Agent, or Firm*—Skjerven, Morrill, MacPherson, Franklin & Friel LLP

[57] ABSTRACT

An internal supply generator includes a charge pump, at least one regulator and a pump controller. The charge pump generates a charge pump signal whose voltage is higher than an input supply voltage. Each regulator produces a generally stable internal supply from the charge pump signal. The pump controller activates the charge pump whenever the charge pump signal falls to within a predetermined voltage of the voltage level of one of the internal supplies.

10 Claims, 4 Drawing Sheets

DUTY CYCLE BASED CHARGE PUMP CONTROLLER

FIELD OF THE INVENTION

The present invention relates to charge pumps generally and to controllers which turn them on and off, in particular.

BACKGROUND OF THE INVENTION

Charge pumps are known in the art of semiconductor chip circuitry. Typical applications include boosting and/or attenuating a given input voltage level. Unfortunately, charge pumps generally produce "noisy" output signals and thus, regulator circuits are often employed to filter the noisy output and to accurately set the final output voltage level.

The power consumption of a charge pump system can be controlled by an on/off circuit which activates the pump until the desired final level is achieved, at which point, the circuit disables the pump to save power. As dynamic conditions alter the desired final level, the control circuit activates the charge pump to re-establish this level. Under a given loading condition, the control circuit generates a charge-pump duty-cycle rate to establish a steady-state operation that maintains the desired level.

The on/off circuit can be tuned to offer a variety of voltage levels. When the main charge pump is off, during the "standby" phase, a relatively small, low power pump is often used to maintain the standby voltage level.

SUMMARY OF THE INVENTION

An object of the present invention is to provide a novel charge pump controller and internal supply generator.

In accordance with a preferred embodiment of the present invention, the controller maintains a pump output level (Vo) which is at least a predetermined level Vy above the highest of the voltage levels regulated from the pump output. This ensures a generally effective operation of the regulator circuits.

Further, in accordance with a preferred embodiment of the present invention, the controller minimizes the number of times that the charge pump is cycled on and off for any given loading condition. The overhead associated with cycling a charge-pump contributes to power consumption. By minimizing the cycling, the overall power consumption is minimized.

There is therefore provided, in accordance with a preferred embodiment of the present invention, an internal supply generator which includes a charge pump, at least one regulator and a pump controller. The charge pump generates a charge pump signal whose voltage is other than (higher or lower) an input supply voltage. The regulator(s) produces a generally stable internal supply from the charge pump signal. The pump controller activates the charge pump whenever the charge pump signal falls below a predetermined voltage level which is a fixed amount above the highest voltage level (relative to ground) of the internally regulated supply or supplies.

In accordance with a preferred embodiment of the present invention, the pump controller includes at least one p-channel, pull-up transistor, an n-channel, leaker transistor and an optional inverter. The pull-up transistor(s) are connected in series between the charge-pump output signal and a node internal to the controller, wherein each pull-up transistor gate is connected to the different internal supplies. The leaker transistor is connected between the internal node and a ground supply and an inverter logically inverts the voltage level of the internal node, thereby producing the pump control signal.

In accordance with a second preferred embodiment of the present invention, the pump controller includes an activation unit for defining an activation voltage for the charge pump, a deactivation unit for defining a deactivation range of voltages for the charge pump, a unit for enabling and disabling the units for defining, an n-channel leaker transistor and an inverter. The activation and deactivation units are connected in parallel between a charge pump output line carrying the charge pump signal and a node. The unit for enabling and disabling enables the activation unit and disables the deactivation unit when the charge pump is shut off and enables the deactivation unit and disables the activation unit when the charge pump is turned on. The leaker transistor is connected between the node and a ground supply and the inverter logically inverts the voltage level of the node, thereby to produce a pump control signal.

Additionally, in accordance with a preferred embodiment of the present invention, the activation and deactivation units each include at least one p-channel, pull-up transistor, wherein each pull-up transistor is controlled by a different one of the internal supplies and wherein the transistors of the activation unit have a different threshold level than the transistors of the deactivation unit.

BRIEF DESCRIPTION OF THE DRAWINGS

The present invention will be understood and appreciated more fully from the following detailed description taken in conjunction with the appended drawings in which.

DETAILED DESCRIPTION OF THE PRESENT INVENTION

Figure 1:
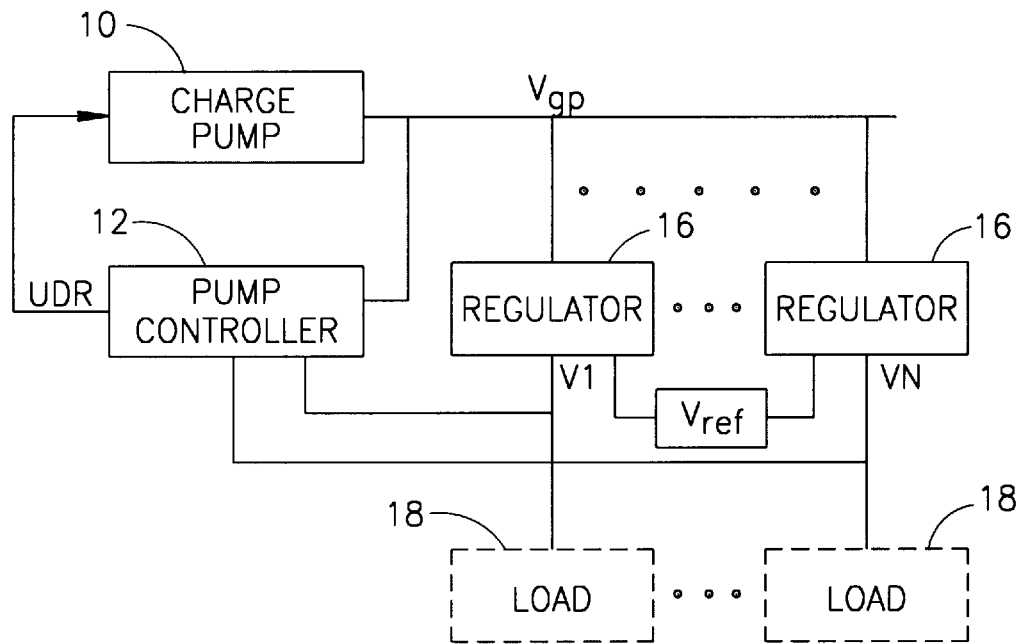
FIG. 1 is a block diagram illustration of a system for producing internal supplies using the charge pump controller of the present invention.

Reference is now made to FIG. 1 which illustrates a system for producing internal supplies using the charge pump controller of the present invention. The system includes a charge pump 10 which, for the purposes of the present specification, includes the pump itself and all of the associated circuitry for activating the pump, the pump controller 12 of the present invention and a plurality of regulators 16.

Each regulator 16 is a standard regulator, such as is known in the art, that takes the noisy charge pump output Vgp and stabilizes it at a predefined voltage level, thereby producing an internal supply Vi, where i ranges from 1 to N. The regulators typically utilize a fixed reference signal Vref to establish their fixed, pre-defined voltage levels.

The present discussion shows two supplies V1 and VN; it will be appreciated that the present invention incorporates all systems producing at least one supply from the charge pump output Vgp. Each supply Vi is utilized for different purposes and thus, each supply Vi has its own load 18, which draws current from the pump.

In accordance with a preferred embodiment of the present invention, the pump controller 12 receives all internal supplies Vi and produces therefrom an activation signal UDR whenever the charge pump output Vgp drops below a predetermined voltage Vy above any one of a plurality of internal supplies which depend on the charge pump output. Written mathematically this is:

UDR=1 if and only if Vgp<Vi+Vy for any of the Vi             (1)

=0 for any other condition

Figure 2:
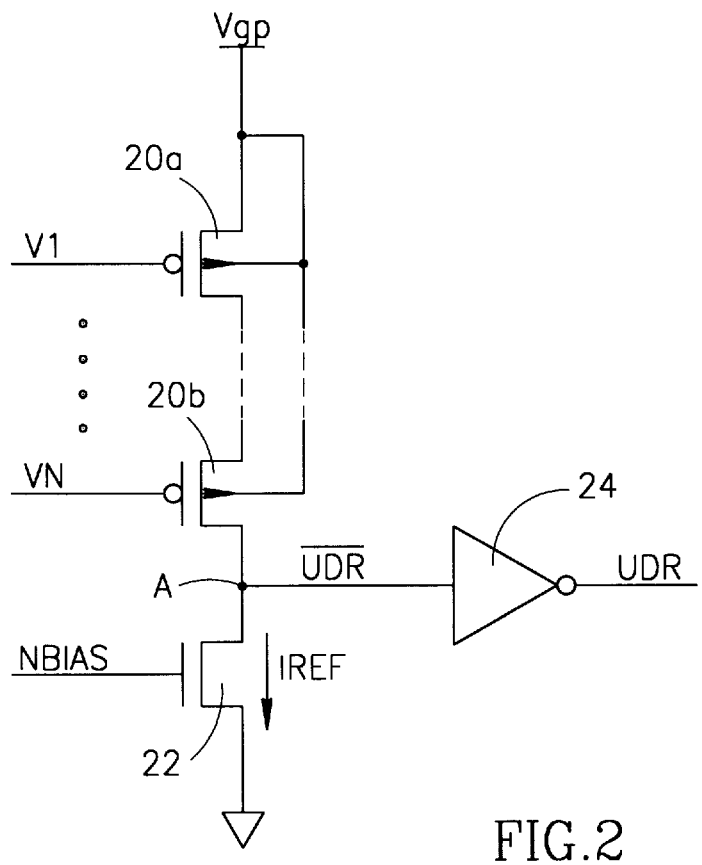
FIG. 2 is a circuit diagram of a first embodiment of the controller of FIG. 1

One exemplary pump controller 12 is shown in FIG. 2, to which reference is now made. The controller 12 comprises a plurality of p-channel, pull-up transistors 20, connected in series, for pulling a node A towards the charge pump output Vgp, an n-channel, leaker transistor 22 for pulling node A towards ground, and an inverter 24 for logically inverting the voltage level of node A, thereby to produce the pump activation signal UDR. Each p-channel transistor 20 is gate controlled by one of the internal supplies Vi. For example, in FIG. 2, p-channel transistor 20a is controlled by the V1 supply and p-channel transistor 20b is controlled by the VN supply.

Leaker transistor 22, which is controlled by an NBIAS reference signal, provides a relatively low current path for node A to discharge to ground when the source to ground voltage Vsg of all the p-channel transistors 20 is less than the p-channel threshold voltage Vth. The latter occurs when the p-channel transistors 20 are off. In this situation, node A goes low and the activation signal UDR goes high, thereby activate the charge pump 10 (FIG. 1).

As for all p-channel transistors, pull-up transistors 20 are activated whenever their gate voltages are lower than their source voltage by the threshold voltage Vth intrinsic to the transistor. The threshold Vth is thus, the predetermined voltage level Vy for the controller of FIG. 2.

For transistor 20a, activation occurs whenever the internal supply V1 is lower than the charge pump output Vgp by threshold voltage Vth. For transistor 20b, whose source is the drain of transistor 20a, activation can only occur if transistor 20a is already activated. In that case, the source will be at the voltage level of Vgp. Thus, for transistor 20b activation occurs whenever a) transistor 20a is already activated and b) the internal supply VN is lower, by threshold voltage Vth, than the charge pump output Vgp. When transistor 20a is not active, no current will flow through transistor 20b which is, therefore, off.

It will be appreciated that node A will be pulled up to the charge pump output level Vgp only if both internal supplies V1 and VN are lower, by more than the threshold voltage level, than the charge pump output level Vgp. This is the desired state where the charge pump 10 has a high enough voltage to fully supply the internal supplies V1 and VN. With node A high, the activation signal UDR is low and, accordingly, the charge pump 10 is inactive.

However, once the charge pump output level Vgp falls below one threshold level above any of the internal supplies, the associated pull-up transistor 20 will be deactivated, and the series of pull-up transistors 20 will be unable to raise node A to the high level, against the n-channel pull-down. As a result, node A will be low and the activation signal UDR will become high, causing the charge pump 10 to be activated. Thus, the charge pump 10 becomes activated whenever its output level drops below one threshold level above any of the internal supplies.

Figure 3:
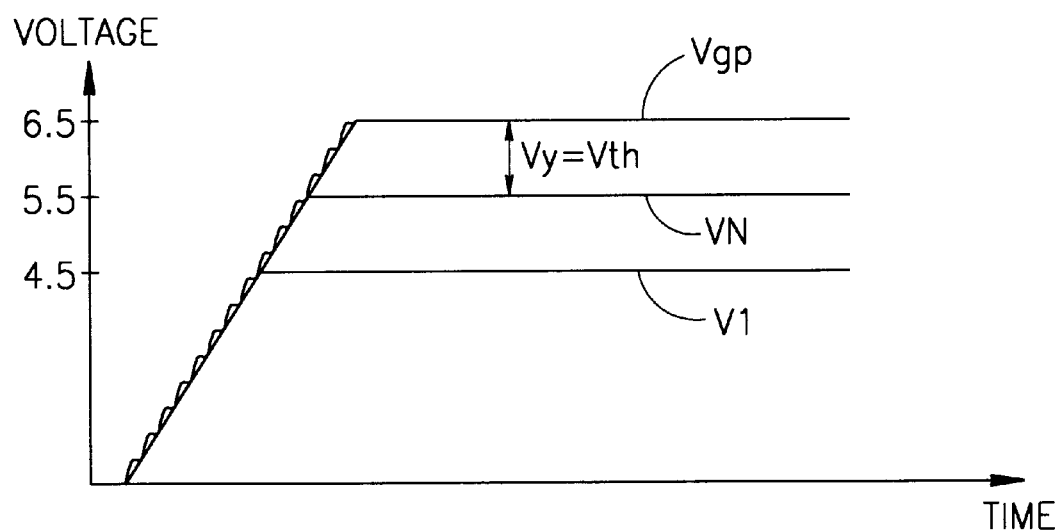
FIG. 3 is a graphical illustration of the operation of the controller of FIG. 2.

It will be appreciated that, upon power up the charge pump 10 (FIG. 1) is initially at a level considerably below the desired levels of the internal supplies. For example and as shown in FIG. 3 to which reference is now briefly made, the charge pump 10 might initially supply 0V while the internal supplies V1 and VN should reach 4.5V and 5.5V, respectively.

The UDR signal continually activates the charge pump 10 until Vgp has reached the desired level, which is one threshold level above the voltage level of the highest regulated internal supply. FIG. 3 shows Vgp at 6.5V. Once all levels have been reached, the charge pump 10 is only activated as needed to maintain the internal supplies at their required levels.

It will be appreciated that a controller having more than two transistors 20, each of which is controlled by a different internal supply, will function as described hereinabove and is incorporated within the present invention. Node A will be pulled up to the charge pump output level Vgp only if the entirety of the internal supplies Vi are lower, by more than the threshold voltage of the p-channel device, than the charge pump output level Vgp. Whenever the charge pump output approaches any one of the multiple internal supplies, the charge pump 10 will be activated.

Since the present invention operates to maintain the charge pump output Vgp at one threshold level above any of the internal supplies, the maximum output voltage Vgp of the charge pump 10 and its activation is changed by changing the pre-defined voltage levels of the internal supplies.

Figure 4:
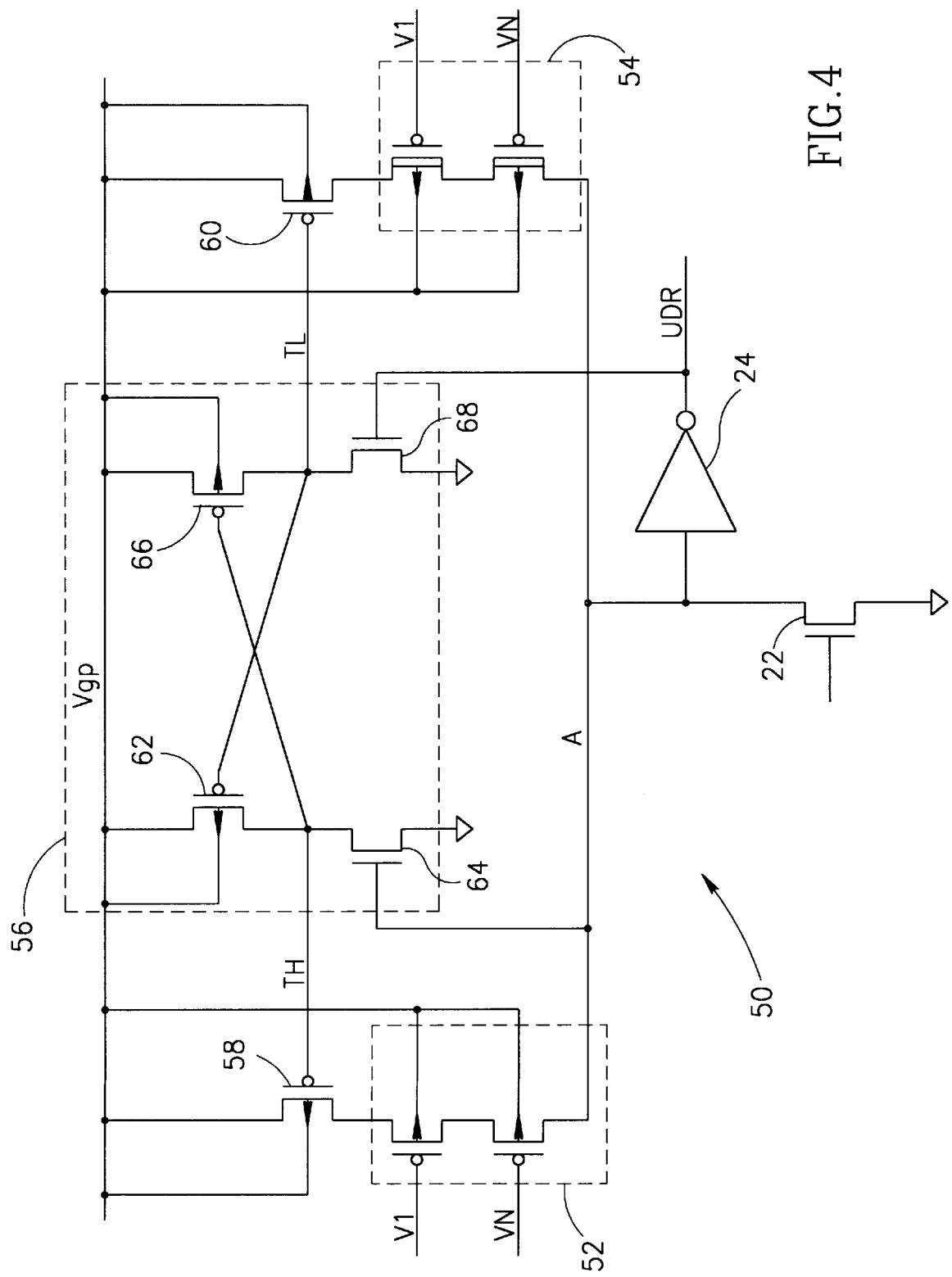
FIG. 4 is a circuit diagram of a second embodiment of the controller of FIG. 1 having hysteresis in its response.

Reference is now made to FIG. 4 which illustrates a further embodiment of the controller, labeled 50, which utilizes some of the principles of the previous controller 12 and adds hysteresis to it. Similar to controller 12, controller 50 includes n-channel, leaker transistor 22 and an inverter 24, both connected to node A, the latter producing the pump activation signal UDR. However, in this embodiment, controller 50 comprises two sets of series-connected p-channel, pull-up transistors, labeled 52 and 54, connected to the node A, a flip-flop 56 and two select transistors 58 and 60.

As in the previous embodiment, there are multiple series-connected pull-up transistors, each controlled by a different internal supply Vi. However, in this embodiment, the transistor threshold voltage levels of the two sets are different. For example, set 52 might have a standard, low threshold level of 1.0V while set 54 might have a high threshold level of 1.5V. The latter threshold level is typical of "natural" devices and thus, the transistors of set 54 are marked in FIG. 4 with a double line. As is known in the art, the two different threshold levels are produced during manufacturing by implanting different threshold dosages in the transistors of the different sets.

The two different threshold levels provide different activation points for the charge pump 10. In the example discussed above, for set 52, the activation point is slightly below 1.0V above any of the internal supplies while, for set 54, the activation point is slightly below 1.5V above any of the internal supplies. The higher activation point is utilized to shut off the charge pump while the lower activation point is utilized to turn it on.

Flip-flop 56, which controls the two select transistors 58 and 60, is designed to select one of the two sets 52 or 54 to be currently active and to shut off the other one. This selects the activation point. Since flip-flop 56 alternately activates select transistors 58 and 60, the activation point depends on the alternating threshold levels, thereby providing the hysteresis.

It will be appreciated that the status of the flip-flop 56 represents the on/off status of the charge pump 10. When flip-flop 56 activates set 52, the charge pump is on while when flip-flop 56 activates set 54, the charge pump is off.

Flip-flop 56 comprises four transistors 62, 64, 66 and 68. Transistors 62 and 66 are p-channel transistors while transistors 64 and 68 are n-channel transistors. Transistors 62 and 64 form one branch and transistors 66 and 68 form a second branch. Both branches are connected in series between the charge pump output Vgp and ground. A TH node between transistors 62 and 64 controls p-channel transistor 66 (of the opposite branch) and select transistor 58. A TL node between transistors 66 and 68 controls p-channel transistor 62 (of the opposite branch) and select transistor 60. N-channel transistors 64 and 68 are controlled by node A and its complement, the UDR signal, respectively.

When node TH is low, select transistor 58 is activated, thereby enabling set 52. As will be shown hereinbelow, whenever node TH is low, node TL is high, thereby disabling set 54. Thus, in this situation, set 52 controls node A, keeping it high as long as the charge pump output Vgp is higher, by the low threshold level, than the highest internal supplies V1 and VN.

When the charge pump output Vgp falls, at least one p-channel transistor of set 52 shuts off, enabling leaker device 22 to discharge node A to 0V which, in turn, causes the charge pump activation signal UDR to go high. This activates n-channel transistor 68, pulling node TL low which causes p-channel transistor 62 to be activated. The low voltage level of node A causes n-channel transistor 64 to be deactivated and thus, the now active p-channel transistor 62 pulls the TH node high, thereby deactivating p-channel transistor 66.

The low voltage level of node TL activates select transistor 60, thereby enabling set 54 while the high voltage level of node TH deactivates select transistor 58, thereby disabling set 52.

With set 54 enabled, the charge pump activation signal UDR remains active until the charge pump output Vgp is higher by the higher threshold level than all of the internal supplies. At that point, node A is brought high, causing the charge pump activation signal UDR to become low.

With node A high, n-channel transistor 64 is activated, pulling node TH low which causes p-channel transistor 66 to be activated. The low voltage level of the charge pump activation signal UDR causes n-channel transistor 68 to be deactivated and thus, the now active p-channel transistor 66 pulls the TL node high, thereby deactivating p-channel transistor 62.

The low voltage level of node TH activates select transistor 58, thereby enabling set 52 while the high voltage level of node TL deactivates select transistor 60, thereby disabling set 54. It will be appreciated that the completed cycle implements a hysteresis loop.

It will be appreciated that the low threshold set 52 is active to turn on the charge pump and the high threshold set 54 is active to shut off the charge pump.

Figure 5:
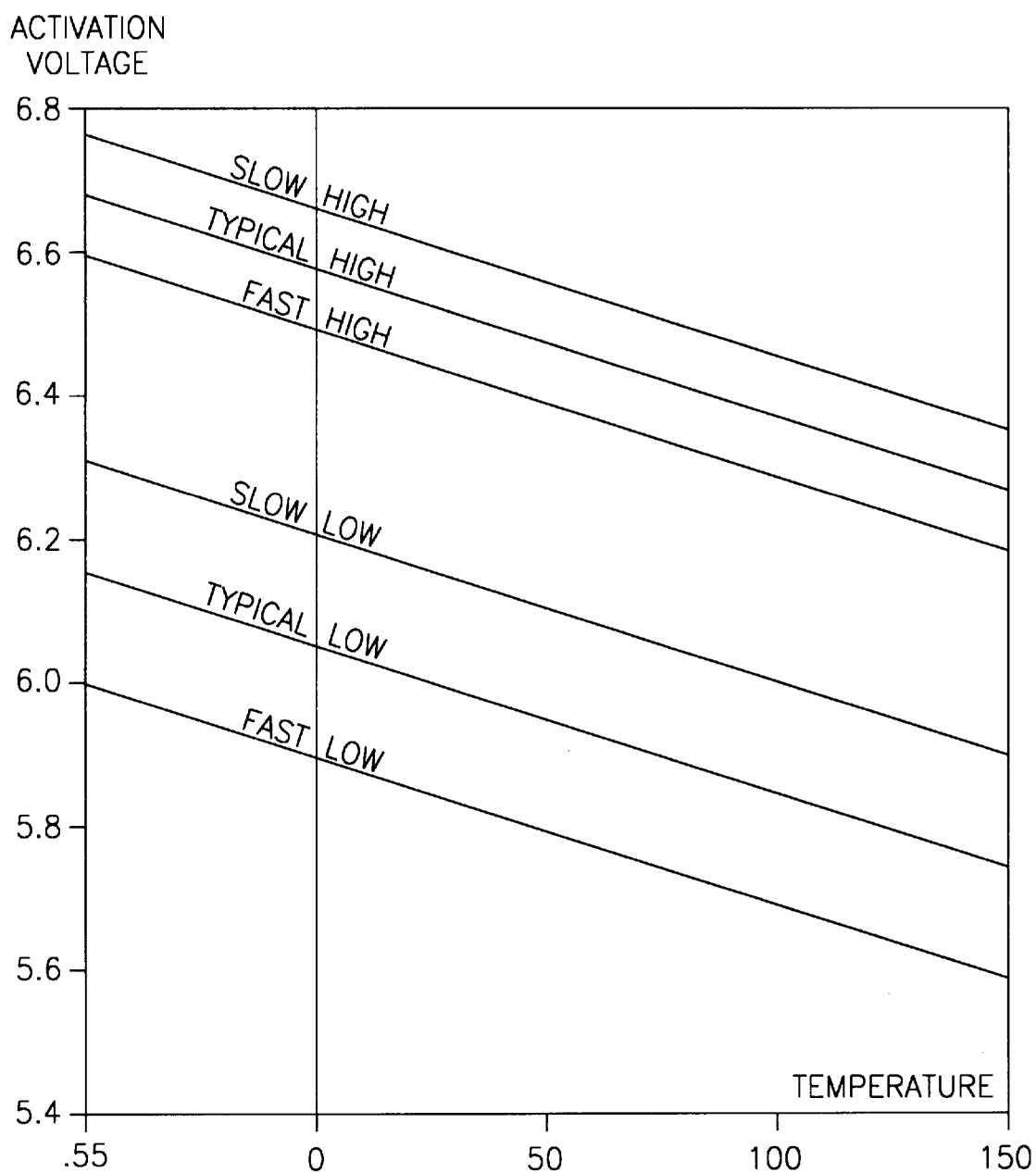
FIG. 5 is a graphical illustration of the response of the activation voltages of the controller of FIG. 4 to temperature.

Reference is now briefly made to FIG. 5 which illustrates the change in activation points as a function of temperature for three different process conditions: a typical process, a slow process where transistors exhibit lower than typical speed, and a fast process where transistors exhibit higher than typical speed. The transistors of each type have the same qualities (shape, size of channel, thickness of oxides, etc.) except for the threshold implant dosages. The latter differ as described hereinabove. As in the example of FIG. 4, the activation points are approximately 0.5V apart.

FIG. 5 shows that the activation voltages vary together with temperature such that the difference in activation points remains the same over a wide range of temperatures. This is a result of the fact that only a Vth implant dose differentiates the high threshold and low threshold p-channel transistors of sets 52 and 54.

It will be appreciated that the controller 12 maintains the charge pump output level Vgp which is at least Vy above the highest of the regulated levels. This ensures generally effective operation of the regulator circuits. Furthermore, the controller 12 does not allow the pump output to exceed Vx above Vy. This limits the stress that a relatively high, on chip voltage can impose on various devices and materials. The objective is improved reliability and extended product life. Finally, the controller 12 minimizes the number of times the charge pump is cycled on and off for any given loading conditions. The cost associated with turning on and off the charge pump is significant power consumption. By minimizing this cycling, the overall power consumption is minimized.

It will be appreciated by persons skilled in the art that the present invention is not limited by what has been particularly shown and described herein above. Rather the scope of the invention is defined by the claims that follow:

What is claimed is:

1. An internal supply generator comprising:
   a charge pump for generating a charge pump signal whose voltage is other than an input supply voltage;
   at least two regulators, each producing a generally stable internal supply from said charge pump signal; and
   a pump controller for activating said charge pump whenever said charge pump signal falls below a predetermined voltage above the voltage level of the highest one of said internal supplies.

2. An internal supply generator according to claim 1 and wherein said pump controller includes:
   at least one p-channel, pull-up transistor, connected in series between a charge pump output line carrying said charge pump signal and a node, wherein each pull-up transistor has a gate connected to a different one of said internal supplies;
   an n-channel, leaker transistor connected between said node and a ground supply,
   wherein a pump controller output signal is a function of the voltage level of said node.

3. An internal supply generator according to claim 1 and wherein said pump controller also includes an inverter for logically inverting the voltage level of said node, thereby to produce said pump control signal.

4. An internal supply generator comprising:
   a charge pump for generating a charge pump signal whose voltage is other than an input supply voltage;
   at least one regulator producing a generally stable internal supply from said charge pump signal; and
   a pump controller for activating said charge pump whenever said charge pump signal falls below a predetermined voltage above the voltage level of the internal supply,
   wherein said pump controller includes:
      activation means for defining an activation range of voltages for said charge pump;
      deactivation means for defining a deactivation range of voltages for said charge pump;
      wherein said activation and deactivation means are connected in parallel between a charge pump output line carrying said charge pump signal and a node;
      means for enabling said activation means and for disabling said deactivation means when said charge pump is shut off and for enabling said deactivation means and disabling said activation means when said charge pump is turned on;

an n-channel, leaker transistor connected between said node and a ground supply; and an inverter for inverting the voltage level of said node, thereby to produce a pump control signal.

5. An internal supply generator according to claim 4 and wherein said activation and deactivation means each include at least one p-channel, pull-up transistor, wherein each pull-up transistor is gate controlled by a different one of said internal supplies and wherein said transistors of said activation means have a different threshold level than said transistors of said deactivation means.

6. An internal supply generator according to claim 4 and wherein said means for enabling and disabling is a flip-flop.

7. A controller for activating a charge pump whenever a charge pump signal falls to within a predetermined voltage of the voltage level of an internal supply, the controller comprising:

at least one p-channel, pull-up transistor, connected in series between a charge pump output line carrying said charge pump signal and a node, wherein each pull-up transistor is controlled by a different one of said internal supplies;

an n-channel, leaker transistor connected between said node and a ground supply; and an inverter for inverting the voltage level of said node, thereby to produce a pump control signal.

8. A controller for activating a charge pump whenever a charge pump signal falls below a predetermined voltage of the voltage level above an internal supply, the controller comprising:

activation means for defining an activation range of voltages for said charge pump;

deactivation means for defining a deactivation range of voltages for said charge pump;

wherein said activation and deactivation means are connected in parallel between a charge pump output line carrying said charge pump signal and a node;

means for enabling said activation means and for disabling said deactivation means when said charge pump is shut off and for enabling said deactivation means and disabling said activation means when said charge pump is turned on;

an n-channel, leaker transistor connected between said node and a ground supply;

an inverter for inverting the voltage level of said node, thereby to produce a pump control signal.

9. A controller according to claim 8 and wherein said activation and deactivation means each include at least one p-channel, pull-up transistor, wherein each pull-up transistor is controlled by a different one of said internal supplies and wherein said transistors of said activation means have a different threshold level than said transistors of said deactivation means.

10. A controller according to claim 8 and wherein said means for enabling and disabling is a flip-flop.

* * * * *